March 30, 1965  E. GIEZENDANNER ET AL  3,175,445
AUTOMATIC TRANSFER AND CUTTING MECHANISM
Filed Jan. 15, 1962  3 Sheets-Sheet 3
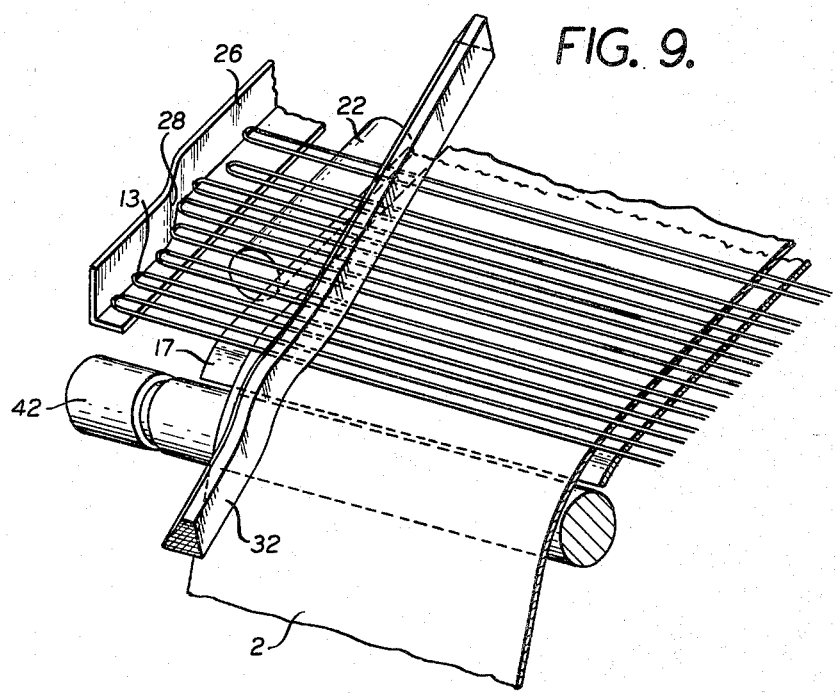
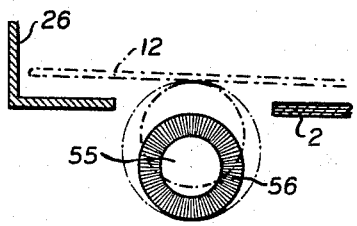 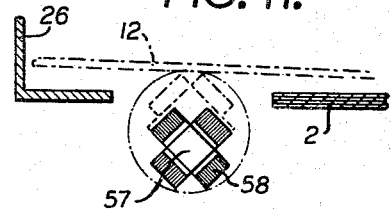
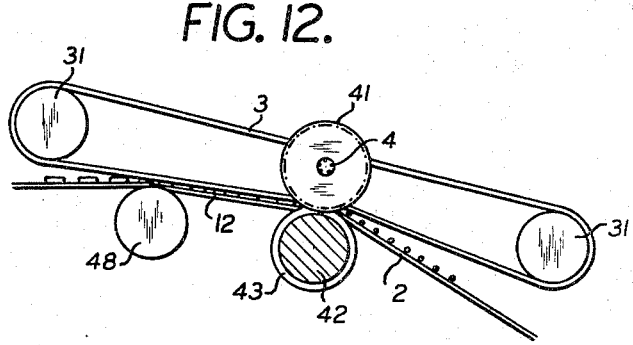
INVENTORS
EMIL GIEZENDANNER
WALTER MUELLER
BY
McGlew and Toren
ATTORNEYS.

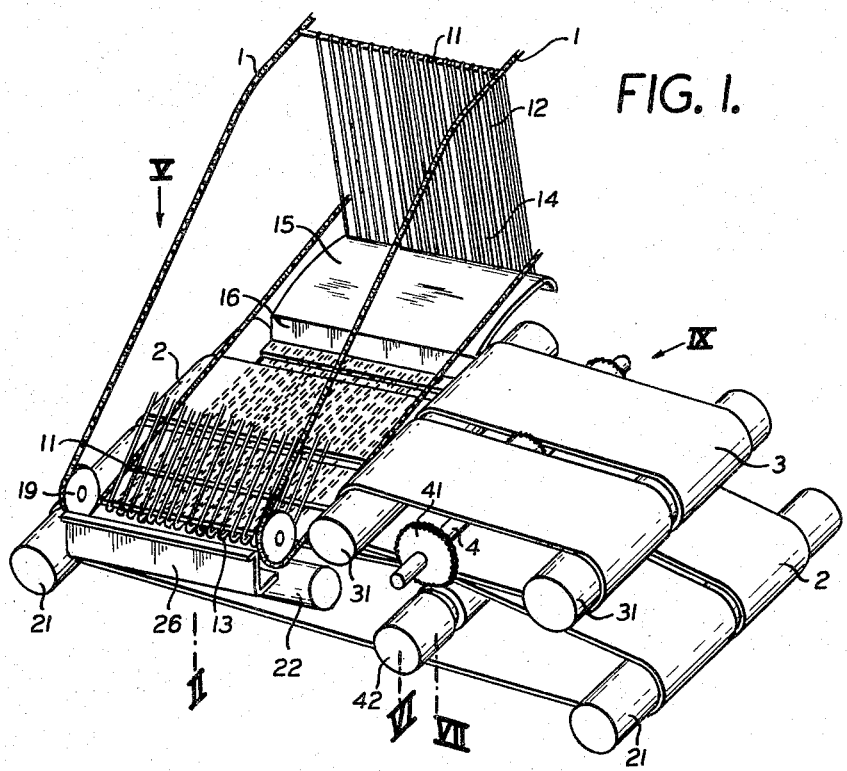

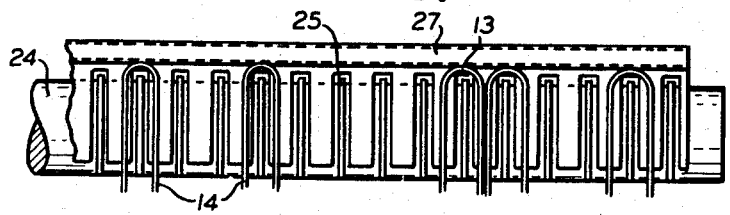
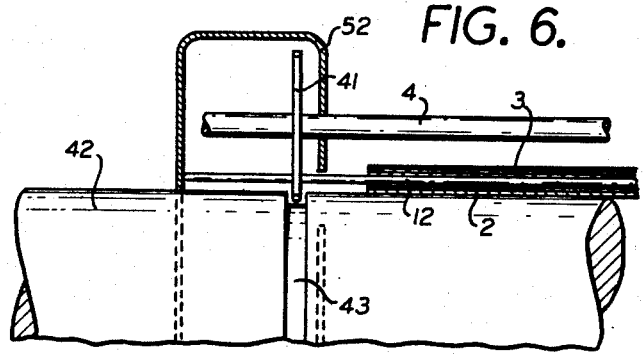
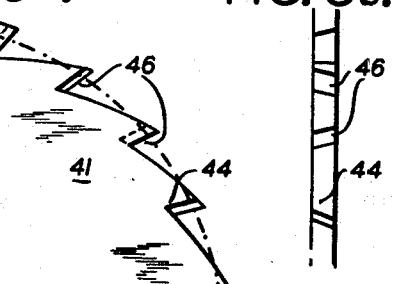
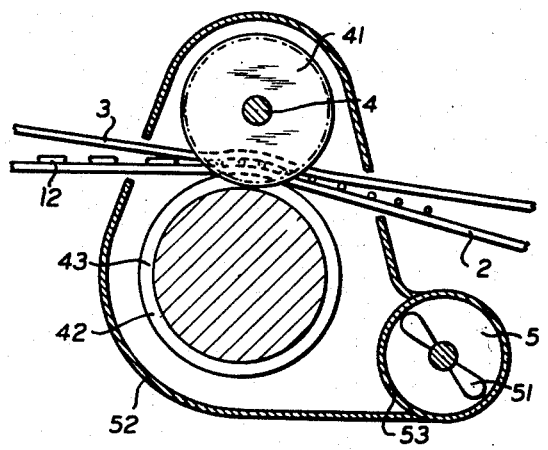

United States Patent Office 3,175,445
Patented Mar. 30, 1965

3,175,445
AUTOMATIC TRANSFER AND CUTTING MECHANISM
Emil Giezendanner, Oberuzwil, and Walter Mueller, Wettersbuhl, Teufen, Switzerland, assignors to Gebrueder Buehler, Uzwil, Switzerland, a firm of Switzerland
Filed Jan. 15, 1962, Ser. No. 166,008
Claims priority, application Switzerland, Jan. 18, 1961, 576/61
12 Claims. (Cl. 83—419)

In the production of extruded dough goods, such as spaghetti, noodles and the like, transfer and trimming or cutting mechanisms for the dough strands are mostly designed for manual or semi-automatic operation. For the cutting operation two independent requirements are of importance; viz.:

(1) Equal length of the depending dough strands.
(2) Perfectly straight, i.e. neither sagging nor bent suspension rods.

In practice the realization of both the above mentioned requirements simultaneously has proved difficult and the mechanisms hitherto known were not entirely satisfactory.

The primary objects of this invention therefore consist in providing simple and effective means for economic transmission, accurate setting and practically dustfree cutting and simultaneous trimming of the extruded dough goods strands in order to obtain strands of exactly equal predetermined length and having perfectly clean cuts.

This invention relates to an automatic transfers and cutting mechanism for extruded strands of dough goods or similar products, said mechanism comprising a first continuous conveyor unit having suspension rods attached thereon to carry said dough goods to a second conveyor unit of adequately subdivided width disposed in a substantially plane parallel relationship with a stripping track pertaining to said first conveyor and arranged for substantially perpendicular retransmission of the goods, a first stop member associated with said stripping track disposed at the open-end side of and for removing said goods from said suspension rods, a second fixed stop member disposed at the opposite knee-end side of said strands, and a shifting unit for longitudinal shifting of said strands against said second stop member, the second conveyor unit subsequently retransmitting said goods to a further processing unit, e.g. a cutting and trimming unit.

Further objects and advantages will become apparent upon consideration of the following description and the accompanying drawings, wherein FIG. 1 is a general perspective view of the transfer and cutting mechanism of this invention, FIG. 2 shows the position and the function of the eccentric shaft along section II in FIG. 1, FIG. 3 is a vertical section along the line II in FIG. 1, showing the cam shaft in position of rest of a second embodiment of this invention, FIG. 4 shows the cam shaft of FIG. 3 in working position, FIG. 5 is a plan view of the cam shaft arrangement in working position in the direction indicated by the arrow V in FIG. 1, FIG. 6 is a sectional view along line VI in FIG. 1, showing the cutter arrangement in combination with a waste exhauster, FIG. 7 is a sectional view along line VII in FIG. 1, showing the cutter arrangement in combination with the waste exhauster, FIGS. 8a and 8b are enlarged fragmentary cutaway-views showing the toothing of the cutter disk, FIG. 9 is a perspective view in the direction indicated by the arrow IX in FIG. 1, showing the amount of shift of the dough strands, FIG. 10 is a sectional view along line II in FIG. 1, showing position and function of an eccentric circular brush of a fourth embodiment, FIG. 11 is a sectional view along line II in FIG. 1, showing position and function of an eccentrically rotating flat brush arrangement of a fifth embodiment, and FIG. 12 is a sectional view along line VII in FIG. 1, showing a holding track (cutting track) in a further embodiment having two bends.

Referring now to FIG. 1, showing the general arrangement of the transfer and cutting mechanism of this invention, reference character 1 denotes a pair of endless chains of a first conveyor unit, followed at right angles by one or more parallel, substantially horizontal endless conveyor belts 2 of a second conveyor unit, endless holding belts 3 for the goods in process and a cutting mechanism 4.

The dough strands 12, arranged in rows of inverted U-shaped pairs on suspension rods 11 are fed at regular intervals by means of a pair of endless conveyor chains 1, belts or the like, as well known in the art and shown in FIG. 1. At the end of the track, the strands 14 of the dough goods 12 originally depending vertically from the suspension rods 11, are canted from vertical into a horizontal position over the leading edge of a canting plate 15. The suspension rods 11 then proceed further around the shaft of return pulleys 19, whereby the dough goods 12 with the tips of their strands 14 butt against a first guide or stop member 16, which may be formed by a portion of canting plate 15. While proceeding further, suspension rods 11 force one of the two of each pair of strands 14 apart from the other and moving out of the canted U-strands, the strands are removed from rods 11 and deposited on the second conveyor consisting of one or more endless conveyor belts 2, arranged on rolls 21 and 42. A shifting unit 22 then pushes the dough strands 12 in their longitudinal direction of knee 13 against a second stop member consisting of an angle 26 arranged parallel to conveyor belts 2. This operation is important since the individual strands 14 of the dough goods 12 in the as-extruded state usually differ considerably in length.

A preferred embodiment of a shifting device may consist of an eccentric shaft 23 disposed between stop angle 26 and conveyor belt 2 as shown in FIG. 2. The dough strands are shifted into the proper cutting position by rotation of eccentric shaft 23, and are then ready for forwarding to the cutting and trimming unit. During retransmissionsion to the cutting station the goods 12 are firmly held in proper cutting position between and by means of conveyor belts 2 and holding belts 3, the latter running over a pair of rotatable rolls 31.

FIGS. 3, 4 and 5 show another embodiment of the shifting unit, consisting of a cam shaft arranged near the knee-ends 13 of the goods 12 between stop angle 26 and convided with regularly spaced notches, instead of stop-angle of substantially radially projecting cams 25, each having a substantially radial non-cutting leading face and a generally convex curved back face. In conjunction with a cam-shaft a stop-angle 27 having a plain vertically disposed stop limb and a horizontal limb longitudinally provided with regularly spaced notches, instead of stop-angle 26, is used. In their position of rest, shown in FIG. 3, cams 25 are retracted below the conveying track, whereas in their working position, shown in FIGS. 4 and 5, they project beyond the goods on the conveying track. Cams 25 are brought into operating or working position by a corresponding rotation of cam-shaft 24, the cams or fingers 25 thereby moving into or between the individual strands 14 of the goods 12 and pulling them by their knees 13 against plain vertical portion of stopangle 27. Immediately before further treatment, e.g. before arrival cutting and trimming station the goods are gripped gently but firmly between belts 2 and 3.

In further embodiments shown in FIGS. 10 and 11 the shifting unit consists of a set of brushes eccentrically disposed on a rotatable shaft.

In FIG. 10 a shifting unit consisting of a circular brush 56 arranged on an eccentric shaft 55 is shown. Counterclockwise rotation of shaft 55 brings the upper surface line of brush 56 from its position of rest below, into a working position above the conveying track, thereby shifting the goods 12 against stopangle 26.

FIG. 11 shows a shifting unit consisting of an eccentric shaft 57, having a plurality of faces and brushes 58 of flat shape fixed thereon, the working principle being basically identical as in the preceding arrangement.

As already mentioned and shown in FIG. 1, the goods pass a cutting and trimming station, comprising a cutter shaft 4 having cutting disks 41 fixed thereon. Opposed to cutter shaft 4 below the conveying track a counter-roll 42 is arranged in parallel relationship to cuttershaft 4. Recesses 43 in counter-rolls 42 provide a clearance for cutting disks 41 as may be seen from FIG. 6. The position of cutter shaft 4 in respect of countershaft 42 and the change from a substantially horizontal to a slightly sloping conveying track is shown in FIG. 7. Cutting of the knees 13 and trimming the strands 14 to the required length for packing is done simultaneously by cutting disks 41 spaced apart from each other accordingly on the cutter shaft 4. In order to obtain clean cuts, finely teethed cutting disks 41 having alternately disposed cutting edges 46 on subsequent teeth 44, as may be seen in FIGS. 8a and 8b, have proved convenient.

In a further embodiment shown in FIG. 9 a second stop member angle having a slightly curved vertical portion 28 provides a small additional reverse shift, whereby the goods are already subject to a slight holding pressure. To this effect a slightly curved supporting member 17 is provided for conveyer belts 2. In the subsequent portion of the conveying track counter-roll 42 provides for a further increased curve and a corresponding increase in holding pressure during the cutting operation, while ready longitudinal movability of the goods is obtained by a preceding slightly conical intake. Instead of flat holding belts 3, V-shaped holding belts 32, as shown in FIG. 9, may also be used.

A further embodiment of a holding track having two bends is shown in FIG. 12. Instead of a slightly bent supporting member 17 (FIG. 9) a first supporting-roll 48 is used for conveying belts 2. This arrangement moreover provides a zone, wherein adequate holding pressure still enables easy longitudinal movement of the strands 14 during their passage along the curved stopangle portion 28 in FIG. 9. During passage over roll 42 of the cutting unit the goods are held firmly in position to enable proper cutting.

Also shown in FIGS. 6, 7 and 8 is a waste exhausting or suction unit 5 having a ventilator 51, a suction cover 52 and a collecting duct 53 as substantial components. In conjunction with rotating cutting disks as described hereinbefore, a rigid, recessed, or plain counter-roll, or slotted conveyer belts may also come into consideration.

Although only certain and specific embodiments of the present invention are shown, it is to be understood, that many modifications are possible without departing from the spirit of this invention. Instead of the combined transfer and cutting mechanism described above, individual transfer and cutting mechanism units respectively may also come into consideration.

Instead of a ventilator 51, a chopping ventilator may also be used.

We claim:

1. An automatic transfer and cutting mechanism for extruded strands of dough, or the like, comprising: a first endless conveyor having a working run and a return run, and including a plurality of suspension rods extending transversely thereof in spaced relation longitudinally thereof, each suspension rod carrying a plurality of vertically arranged dough strands looped thereover; a stationary canting plate beneath the working run of said first endless conveyor; the working run of said first endless conveyor converging toward a horizontal plane; said canting plate being adapted to engage the vertical dough strands, as said first conveyor's suspension rods move the strands across said canting plate during the working run, thereby moving the strands toward a horizontal attitude; a first stationary stop member extending transversely of said canting plate for temporarily engaging the free end portions of the strands and allowing said suspension rods to be moved by the first conveyor out of engagement with said strands during the return of said first conveyor; a second conveyor arranged relative to said first conveyor and said canting plate to receive the horizontal strands and convey said horizontal strands in a crosswise direction relative to the longitudinal central axes of the strands; a second stationary stop member extending transversely of said canting plate at a spaced distance from said first stop member equal at least to the length of the looped strands, at an end of said first conveyor adjacent the bight ends of the looped strands and adjacent said second conveyor; and a shifting unit for engaging and shifting the horizontal strands, in a direction along the longitudinal axes of the strands toward said second stop member to engage the bight ends of the looped strands with said second stop member, thereby accurately aligning the strands as they are received for conveyance, in a direction transversely of their lengths, by said second conveyor.

2. Automatic transfer and cutting mechanism, as claimed in claim 1, wherein said shifting unit is comprised of a circular brush rotating eccentrically to shift said strands against said second stop member thereby aligning said strands on said second conveyor.

3. Automatic transfer and cutting mechanism, as claimed in claim 1, wherein said shifting unit is comprised of an eccentrically rotating polygonal shaft having flat brushes secured thereon, said brushes shifting said strands against said second stop member thereby aligning said strands on said second conveyor.

4. Automatic transfer and cutting mechanism, as claimed in claim 1, wherein said second conveyor is comprised of two juxtaposed endless conveyor belts for conveying said aligned strands; and, wherein said mechanism is further comprised of a cutting station adapted to receive said aligned strands as they are conveyed between said juxtaposed belts, said cutting station comprising a rotatable cutter-shaft having a predetermined number of finely teethed cutter disks secured thereon and a rigid counter-roll having recesses disposed in surface portions thereof opposed to said cutting disks.

5. Automatic transfer and cutting mechanism, as claimed in claim 4, wherein said cutting disks have alternately disposed cutting edges on subsequent teeth.

6. Automatic transfer and cutting mechanism, as claimed in claim 4, further comprising waste exhausting means comprising a suction ventilator associated with said cutting wheels.

7. Automatic transfer and cutting mechanism, as claimed in claim 4, further comprising a supporting member for the conveyor belts to create a slight first vertical bend, and wherein a subsequent bend of a greater degree is created by said rigid recessed counter-roll.

8. Automatic transfer and cutting mechanism, as claimed in claim 7, wherein said supporting member is a first supporting roll to create a slight inclination; said mechanism further comprising a second counter-roll to subsequently create a steeper second inclination corresponding to said greater degree bend.

9. The mechanism, according to claim 1, wherein said shifting unit comprises a rotatable, eccentrically mounted shaft situated intermediate said second stop member and said second conveyor, said shaft's eccentric rotation shifting the bight ends of said strands against said second stop member thereby aligning said strands accurately on said second conveyor.

10. The mechanism, according to claim 1, wherein said second stop member includes a vertical wall, having a first portion, cooperable with said shifting means, which extends substantially parallel to the direction of movement of said second conveyor, and a second portion, extending from said first portion in the direction of movement of said second conveyor, and shifted inwardly relative to said second conveyor whereby the strands, as they are conveyed by said second conveyor, are shifted longitudinally of their longitudinal axis in the direction of their free ends.

11. Automatic transfer and cutting mechanism, as claimed in claim 1, wherein said shifting unit comprises an oscillatable cam-shaft having a plurality of narrow cams spaced longitudinally thereof, the oscillation of said cam shaft causing said cams intermittently to engage the bight ends of said strands, as they are received for conveyance by said second conveyor, to move the bight ends into engagement with said second stop member.

12. The mechanism, according to claim 11, wherein said second stop member is an angle having a vertical leg and a horizontal leg, said horizontal leg having a plurality of spaced-apart slots therethrough adapted for receiving the oscillated cams as said cams align the bight ends of the strands against said vertical leg of said second stop member.

References Cited by the Examiner

UNITED STATES PATENTS

| | | | |
|---|---|---|---|
| 55,336 | 6/66 | Merriam et al. | 83—422 |
| 1,578,855 | 3/26 | Schoendelen | 83—419 |
| 2,159,260 | 5/39 | Dummer et al. | 83—418 |
| 2,235,960 | 3/41 | Curtis | 83—155 |
| 2,329,469 | 9/43 | Huck | 83—500 |
| 2,593,543 | 4/52 | Curioni | 107—54 |
| 2,649,055 | 8/53 | Borrelli | 107—7.8 |
| 2,917,959 | 12/59 | Senzani | 83—419 |

FOREIGN PATENTS 437,941  10/25  Germany.

ANDREW R. JUHASZ, *Primary Examiner.*

HUNTER C. BOURNE, JR., *Examiner.*